Sept. 5, 1939.  N. M. THOMAS  2,172,182
APPARATUS FOR FORMING, REFRIGERATING, AND HARVESTING
MULTIFLAVORED ICE CREAM AND SIMILAR SUBSTANCES
Original Filed April 17, 1935  2 Sheets-Sheet 1
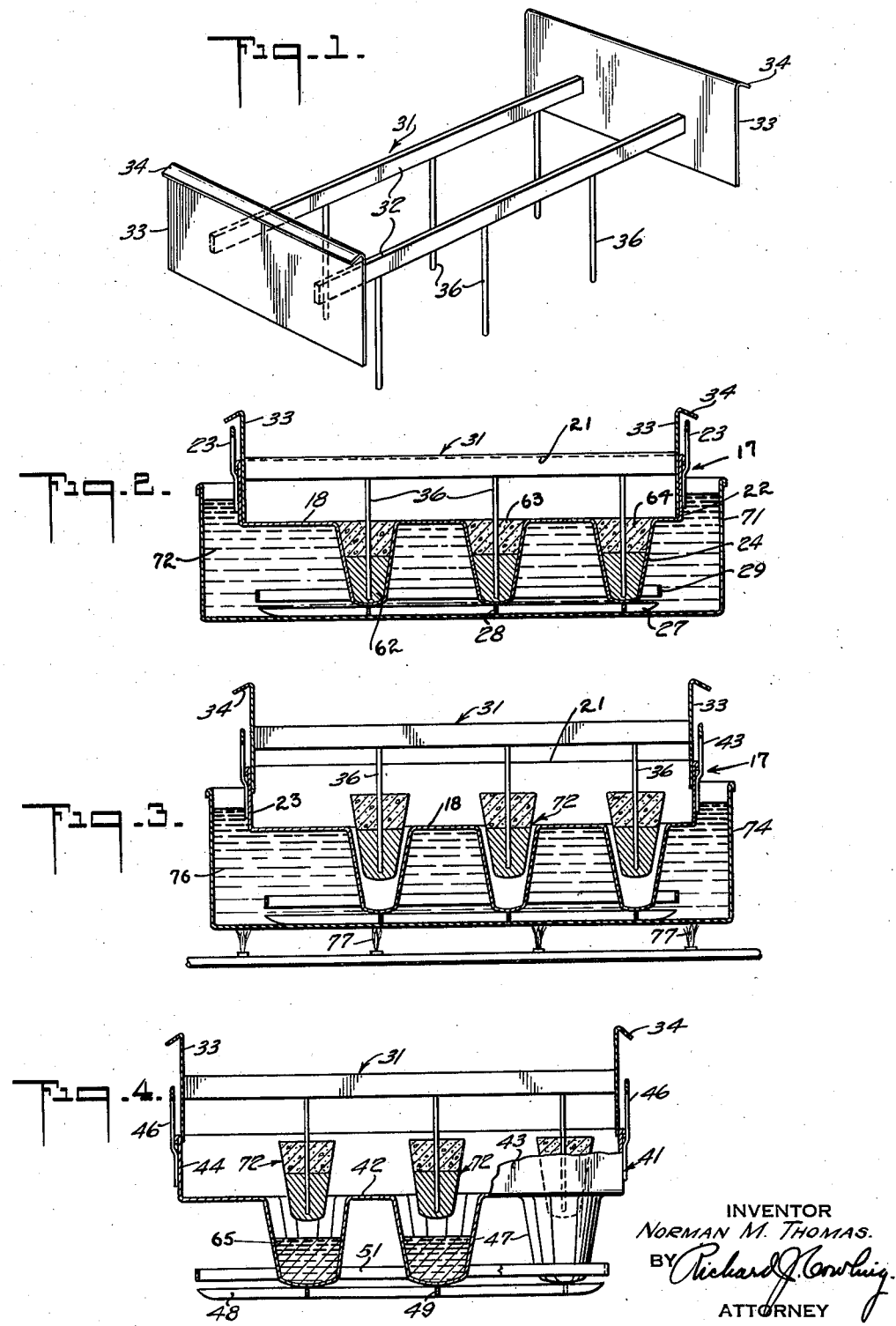

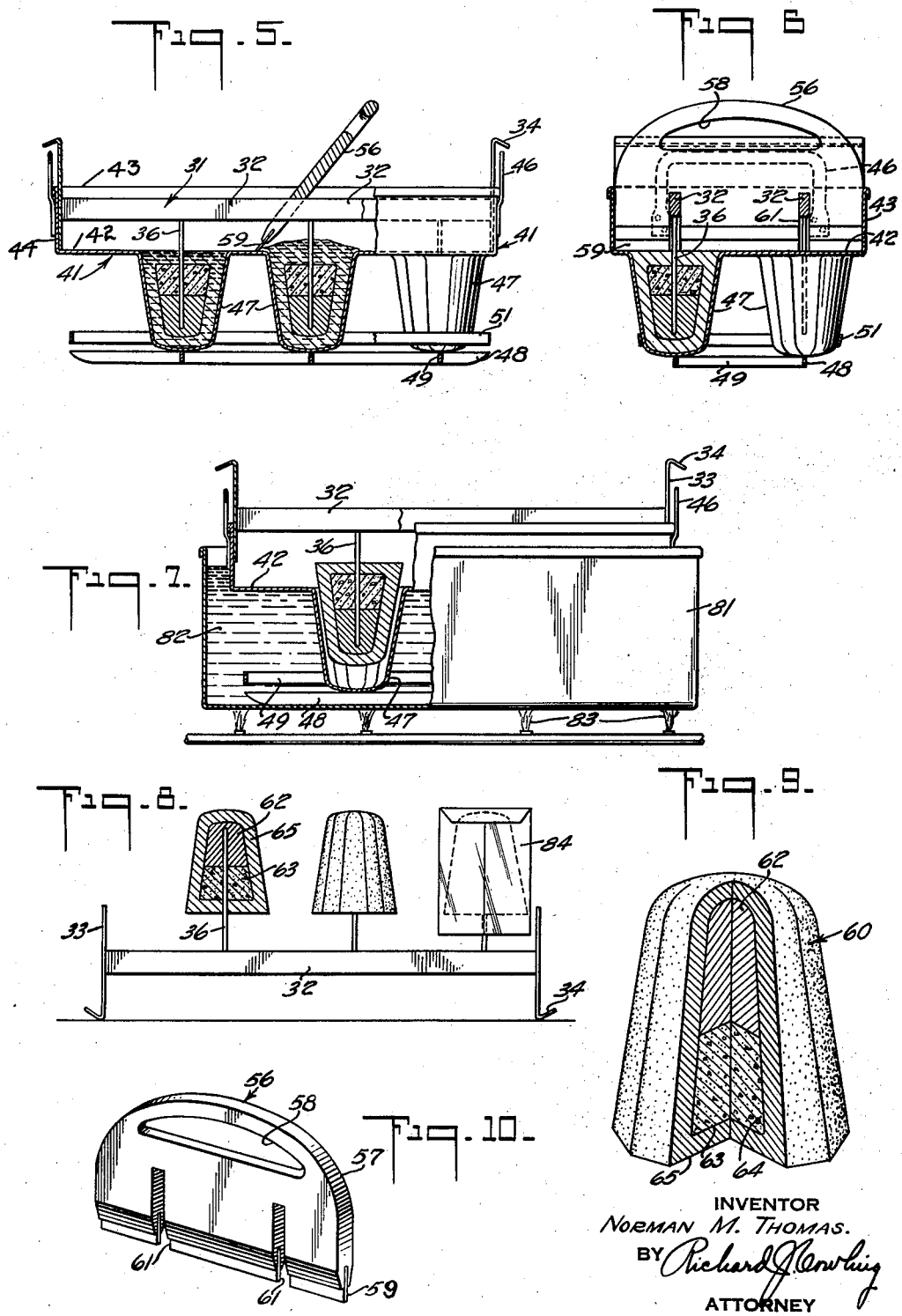

Patented Sept. 5, 1939

2,172,182

UNITED STATES PATENT OFFICE 2,172,182

APPARATUS FOR FORMING, REFRIGERATING, AND HARVESTING MULTIFLAVORED ICE CREAM AND SIMILAR SUBSTANCES

Norman M. Thomas, Brooklyn, N. Y., assignor to Joe Lowe Corporation, New York, N. Y., a corporation of Delaware Original application April 17, 1935, Serial No. 16,810. Divided and this application November 14, 1935, Serial No. 49,692

3 Claims. (Cl. 107—8)

The present invention relates to apparatus for forming, refrigerating and harvesting water-ice, sherbet, ice cream, frozen custard and the like, in individual servings or units, each serving consisting of a combination of different flavors of the same substance or of a combination of different substances, the servings being provided either with or without a handle member. The invention has particular relation to new and improved apparatus for making a plurality of such individual composite servings simultaneously in a most efficient, economical and sanitary manner.

This application is a division of my co-pending application Serial Number 16,810, filed April 17, 1935, and which issued July 12, 1938, as Patent No. 2,123,215.

Heretofore, confectionery products have been made in the form of individual servings consisting of various combinations of flavors and/or substances, but the disadvantages encountered in their manufacture with known methods and apparatus have prevented their production on a large commercial scale. Such confectionery products were made with manual molding methods and refrigerating the materials in an ordinary ice cream plant hardening room, or were formed by a molding operation in which a plurality of hollow shells were made by various methods in multi-cavity molds, and the hollow centers or openings in said shells were subsequently filled with another kind of substance or with chopped fruits, nuts and the like. These methods, and the apparatus used in conjunction therewith, were very laborious, expensive and unsanitary. The present invention overcomes the disadvantages of the former methods and apparatus, and permits the manufacture of such individual composite servings efficiently, cheaply and sanitarily on large scale production.

An object of the present invention is the provision of simple and efficient apparatus, which is highly sanitary and of an inexpensive construction, for simultaneously carrying out the manufacture of a plurality of multi-flavored or composite servings in an economic and efficient manner.

Another object of the invention is to provide a simple and inexpensive spur plate manipulating device which will enable the handling of a plurality of servings simultaneously in an efficient and sanitary way.

A further object of the invention is to provide a novel and efficient device for removing the excess material from a mold structure containing a plurality of multi-flavored or composite servings after the center portions thereof have been firmly bonded to the spurs of the handling mechanism and submerged into the coating material in the molds.

Another object of the invention is the provision of a holder by which a plurality of handle stick servings may be manipulated in the manufacture of multi-flavored or composite servings, and by which apparatus the handles may be left in the finished servings at the end of the process of manufacture.

Other and further objects and advantages of the invention reside in the detailed construction of the apparatus, which result in simplicity, economy and efficiency, and which will be apparent from the following description, wherein a preferred form of embodiment of the invention is shown, reference being had to the accompanying drawings, forming a part hereof, in which:

Fig. 1 is a perspective view of the peg structure used in removing individual servings which are not provided with handle members from the molds, and for subsequently manipulating the servings during the remainder of the manufacturing operation;

Fig. 2 is a longitudinal sectional view of the first mold, with the peg structure of Fig. 1 positioned therein, and showing the combined apparatus positioned in a brine tank being subjected to refrigerating temperatures;

Fig. 3 is a longitudinal sectional view of the mold and peg structures shown in Fig. 2, being positioned within a defrosting tank of warm water, and illustrating the manner in which a plurality of servings are simultaneously removed from their individual molds by means of the peg structure;

Fig. 4 is a side elevational view, partially in section, illustrating the manner in which the individual servings removed from the mold structure in Fig. 3 are inserted into a second mold that is partially filled with material to be frozen;

Fig. 5 is a longitudinal sectional view, partially in elevation, showing the servings removed from the first molds in Fig. 3 completely submerged in the unfrozen material of the second molds, and illustrating the manner of removing the excess material from the second molds by means of a squeegee after the servings have been positioned therein;

Fig. 6 is an end view, partially in section, of the apparatus shown in Fig. 5;

Fig. 7 is a side elevational view, partially in section, illustrating removal of the completed unitary servings from the second mold by means of the peg structure, while the apparatus is partly submerged in a defrosting tank of warm water;

Fig. 8 is a side elevational view, partially in section, illustrating how the completed unitary servings are covered with moisture proof bags while still remaining firmly fastened to the peg structure shown in Fig. 1;

Fig. 9 is an enlarged perspective view, partially in section, illustrating a handleless composition serving made in accordance with my apparatus;

Fig. 10 is an enlarged perspective view of the squeegee shown in Figs. 5 and 6, which is used for leveling and removing the excess material from the second mold structure after the peg structure has been positioned therein.

Referring now to the drawings, there is shown in Fig. 1 a rack or peg structure 31, showing two spaced parallel bars 32 mounted between end plates 33, the upper ends of which are bent outwardly, as indicated at 34, to provide handle means for facilitating manipulation of the rack. A plurality of spaced depending pegs 36 extend downwardly from the underside of the bars 32, the pegs of one bar being staggered with respect to the other bar to correspond to the spacing of the molds 24 of the mold structure 17 of Fig. 2.

The mold structure 17, shown in Figures 2 and 3, consists of a pan 18, having upstanding sidewalls 21 and end walls 22, the latter being provided with handles 23 for raising and transporting the mold structure 17. The mold pan 18 has a plurality of separate molds 24, adapted to receive material, depending therefrom and being formed integrally therewith, said molds 24 being spaced in two parallel rows with the molds of one row being staggered with respect to the molds of the other row. A runner 27 is mounted, by spot-welding or other suitable means, to the bottoms of the molds 24 of each row, upon which the mold structure is adapted to rest or be moved by sliding along the floor, table or other support. The runners 27 are rigidly connected transversely of the mold structure 17 by means of suitable brace rods 28. A metal band or bumper guard 29 is mounted around the lower ends of the molds 24, being securely welded to each of the molds 24, for bracing the lower ends thereof and to protect the molds 24 from being damaged.

Referring generally to Figs. 4 to 7, inclusive, of the drawings, there is shown a second mold structure 41, which is similar in construction to the mold structure 17, except that the individual molds are larger in size and of a different ornamental shape. This mold structure 41 consists of a pan 42, having upstanding sidewalls 43 and end walls 44, the latter being provided with handles 46 for raising and transporting the same. The mold pan 42 has a plurality of spaced separate molds 47 depending therefrom and being formed integrally therewith, said molds 47 being spaced in two parallel rows with the molds of one row being staggered with respect to the molds of the other row. Runners 48 are mounted on the bottoms of the molds 47, and are suitably braced with transversely extending brace rods 49. A metal band or bumper guard 51 is mounted around the lower ends of the molds 47, completely encircling the pendant molds 47 of the mold structure 41 for bracing the same and providing protection for the molds 47 from damage.

The squeegee 56 shown in Fig. 10 is intended to be used in conjunction with the peg structure 31, shown in Fig. 1, and consists of a rigid back member 57, having an elliptical opening 58 in the upper portion thereof to provide handle gripping facilities for manipulating the same, and a flexible rubber member or scraping edge 59, having spaced inwardly extending slots 61 adapted to receive and engage the parallel bars 32 of the peg structure 31, the bars forming a track for guiding the movement of the squeegee 56 in leveling and removing the excess material from the second mold structure 41.

The multi-flavored or composite unitary serving 60, shown in Fig. 9 of the drawings, consists of a central core formed with the upper portion 62 made of chocolate ice cream, and the lower part 63 made of a fruit flavored ice cream having pieces of chopped fruits 64 therein, and then the entire core is covered with a layer of vanilla ice cream 65. It is obvious, however, that many different combinations of flavors may be used, or that the various parts of the serving 60 may be formed of other materials in other combinations, such as forming the portion 62 of ice cream, the portion 63 of frozen custard and covering the core with a layer of water-ice in place of the ice cream 66, without departing from the spirit of the invention.

In the manufacture of the serving 60, the apparatus shown and described in connection with Figures 1 to 8, inclusive, are used in the following manner: The molds 24 of the mold structure 17 are partially filled, in any suitable manner, with chocolate ice cream 62. The ice cream 62, while being somewhat viscous, has sufficient fluid characteristics to flow and settle in the bottom of the mold 24, and then the unfilled portion of the mold 24 may be filled, in any suitable manner, with another kind or flavor of ice cream or other material, such as fruit ice cream 63 having particles of chopped fruit 64 therein. This second kind or flavor of ice cream 63 is likewise in a semi-fluid or plastic condition, substantially in the condition in which ice cream is drawn from a standard ice cream freezer, but the viscosities of the two susbtances are such that they will not tend to intermix.

When the molds 24 of the mold structure 17 have been completely filled, the peg structure 31 shown in Fig. 1 is placed over the molds, the side and end walls of the mold structure 17 forming a guide for the ends 33 of the peg structure, thereby causing one of the pegs 36 to extend into each mold 24 and be centered therein in the substances to be frozen. The mold structure 17 is then placed in a brine refrigerating tank 71, having circulating brine 72 therein, and the mold structure 17 is permitted to remain in the brine tank 71 until the contents 62 and 63 of the molds 24 have become solidly frozen into an integral mass or core 72 and bonded to the pegs 36. The mold structure 17 and contents are removed from the brine tank 71 and momentarily placed in a defrosting tank 74, containing warm water 76, which may be heated by any suitable means such as a gas burner 77, as best shown in Fig. 3. As soon as the bond between the frozen core 72 and the insides of the mold 24 is melted, the integral frozen masses or cores 72 are removed by lifting the peg structure 31 by the handle members 34, thereby withdrawing the pegs 36 from the molds 24 with the cores bonded thereto, as shown in Fig. 3.

While the mold structure 17 is in the refrigerating tank 71, the mold structure 41, shown in Figs. 4 to 7, inclusive, may be partially filled with unfrozen or semi-frozen material in any suitable manner.

The peg structure 31, which has the integral masses or cores 72 clinging to the pegs 36 thereof, is immediately upon its withdrawal from the mold structure 17 placed over the mold structure 41, the ends 44 thereof acting as guides for the plates 33 of the peg structure, thereby centrally positioning each peg 36 and its core 72 over the molds 47. When the cores 72 are so lowered into the molds 47, they are submerged in the semi-fluid or liquid material 65 in the lower part thereof and thereby displace and force the liquid 65 up and entirely around the core 72 until the entire mold 47 is filled with material. By means of the squeegee 56, having slots 61 therein adapted to engage and ride on the top of the bars 32, as best shown in Fig. 6, the tops of the servings are smoothed out and thereby formed, and any excess material may be removed from the mold structure 17.

The mold structure 41 is next placed in a refrigerating brine tank which is similar in every respect to the brine tank shown in Fig. 2 until the contents thereof are solidly frozen and congealed into a unitary mass or serving. Upon removal of the mold structure 41 from the brine tank, it is momentarily placed in a defrosting tank 81, containing hot water 82, which is heated by means of gas flames 83, as shown in Fig. 7. As soon as the bond is broken between the servings 60 and the insides of the molds 47, the former may be removed from the mold structure 41 by lifting up on the peg structure 31, the servings 60 still being bonded to the pegs 36 thereof. While the confections or servings 60 are bonded to the pegs 36, moisture proof bags 84 may be slipped over them. By this time the metal of the peg structure 31 will have picked up enough heat from the room to sufficiently weaken the bond between the pegs 36 and the servings 60 so that the latter may be easily removed manually from the peg structure.

Although I have not described a chocolate coated or other coated confection, it is obvious that the handleless serving 60 may be coated by dipping the servings in a bath of molten chocolate or other coating material (not shown) while they remain bonded to the pegs 36 of the peg structure 31, as shown in Fig. 8.

Although I have only described in detail one modification which my invention may assume, it will be apparent to those skilled in the art that the invention is not so limited, but that various other modifications may be made therein without departing from the spirit thereof or from the scope of the appended claims.

What I claim is:

1. Apparatus for forming, refrigerating and harvesting unitary servings, including in combination a mold structure comprising a pan having upstanding sidewalls and a plurality of spaced depending molds, a rack comprising a peg structure including spaced bars connected only at their ends and having a plurality of spaced pegs depending therefrom and adapted to extend into the molds of the mold structure, a slotted squeegee member for slidably engaging said spaced bars for smoothing off the tops of said servings and removing excess material from the mold pan.

2. Apparatus for forming, refrigerating and harvesting unitary servings of the character described which comprises, in combination, a mold structure including a pan having upstanding sidewalls and a plurality of spaced depending molds, a rack comprising a peg structure including spaced parallel bars having a plurality of spaced pegs depending therefrom and adapted to extend into the molds of the mold structure, and a squeegee having slots therein for slidably engaging said spaced bars and for forcing the material on the mold pan into the molds of the mold structure, thereby smoothing and forming the top portions of said confections.

3. Apparatus for forming, refrigerating and harvesting unitary servings of the character described which comprises, in combination, a mold structure including a pan having upstanding sidewalls and a plurality of spaced depending molds, a rack comprising a peg structure including spaced parallel bars connected only at their ends and having a plurality of spaced pegs depending therefrom and adapted to extend into the molds of the mold structure, and a squeegee having slots therein for slidably riding on said spaced bars for leveling the tops of said servings and removing the excess displaced material from the mold pan.

NORMAN M. THOMAS.